3,096,184
GLASS MARKING INK
John L. Gallup Bloomfield, N.J., assignor to Radio Corporation of America, a corporation of Delaware
No Drawing. Filed Sept. 20, 1961, Ser. No. 139,377
5 Claims. (Cl. 106—20)

This invention relates to glass marking inks and, more particularly, to an improved opaque glass marking ink, having a bluish white color, that may be fused to a glass surface to produce a permanent opaque mark thereon.

In the marketing of articles such as electron vacuum tubes having glass envelopes, there is applied to each tube a number or symbol indicating the tube type and also a trademark or brand name. It is desirable that these marks be readily identifiable and also that they should not rub off or deteriorate with long continued usage. Previously, difficulties have been experienced with tube type markings in that they have tended to be something less than permanent and it therefore becomes difficult to determine the tube type when replacements are necessary. Another difficulty has been non-uniformity of the color of the marks from one production batch to the next, thus detracting from the appearance.

A marking ink which has been used for vacuum tubes has comprised titanium dioxide and eutectic lead borate in a vehicle such as glycerine. The eutectic lead borate fuses at relatively low temperature to glass, and titanium dioxide provides a desirable white color. The ink is satisfactory provided the gas flame commonly used to fire the ink and fuse it to the glass surface is sufficiently oxidizing in nature. However, if the gas flame is out of adjustment, as frequently happens in commercial production over a period of time, insufficient air supply to the flame causes the flame to assume a yellowish color and become slightly reducing in nature. When this happens, the marking ink containing eutectic lead borate tends to assume a color which is yellow to brown due to partial reduction of the lead compound.

The discoloration not only detracts from the appearance of the mark but the mark is also more difficult to read against certain backgrounds commonly found within vacuum tubes, such as that due to flashing of the metallic getter material within the tube.

One object of the present invention is to provide an improved glass marking ink less susceptible to change in color with changes in the oxidizing or reducing nature of the gas flame used to fuse the ink to the tube surface.

Another object of the invention is to provide an improved glass marking ink which is uniformly bluish white in appearance.

A further object of the invention is to provide an improved glass marking ink having good legibility against dark backgrounds.

The above and other objects are achieved in the marking ink of the present invention which comprises, in addition to titanium dioxide and lead borate mentioned above, further ingredients in the form of sodium phosphate, cobalt oxide, and tungstic oxide. This ink has a bluish white appearance which is unvarying regardless of whether the gas flames used in manufacturing are oxidizing or reducing. The adherence properties are at least as good as inks previously used.

A preferred embodiment of the ink in accordance with the present invention will now be given and its method of application explained.

A first fused glass composition was prepared by making up a charge consisting of 51.8 weight percent $NaH_2PO_4H_2O$ 43.5 weight percent $WO_3$, and 4.7 weight percent CoO. This composition was fused by heating in a porcelain crucible to a temperature of about 900° C. The fused composition is a sodium cobalto tungsto phosphate. The fused product was crushed in an iron mortar and ground 24 hours in a pebble mill. The mill charge was: Fused glass composition—113 grams, glycerine—37.8 grams, and methanol—24 grams. This composition was then mixed with 48.6 grams eutectic lead borate, 32.4 grams titanium dioxide, and additional glycerine in the amount of 93.8 grams. The lead borate and titanium dioxide were milled with the glycerine before adding to the fused glass composition. Eutectic lead borate, as used herein, is composed of 88% PbO and 12% $B_2O_3$ by weight.

The above mixture is applied to vacuum tubes as follows: The mixture is spread upon a platen. A rubber roller rolls back and forth across the platen and across the face of a rubber stamp which is impressed upon successive glass surfaces. In this manner a controlled and uniform quantity of marking ink is applied by the rubber stamp to each glass surface it is desired to mark. The glass surfaces are then carried by any suitable conveyor apparatus past a gas flame of sufficient intensity to heat the marked glass to approximately 550° C. This heating oxidizes and drives off the vehicle of the ink mixture and fuses the other ingredients to the surface of the glass. The combination of titanium dioxide and cobalt oxide produces a bluish white color regardless of whether the gas flames are oxidizing or reducing in nature.

The final composition of the marks on the glass, expressed, for convenience, as percentage by weight of oxides in the various ingredients is as follows:

| | |
|---|---|
| $Na_2O$ | 8.02 |
| $PbO$ | 23.60 |
| $CoO$ | 2.82 |
| $TiO_2$ | 17.90 |
| $WO_3$ | 26.10 |
| $B_2O_3$ | 3.22 |
| $P_2O_5$ | 18.34 |

The above also represents the composition of the ink solids (that is, with the vehicle omitted) prior to fusing the marking ink to the tube surface. The composition of the ink may be varied considerably. The solid ingredients may be varied substantially as follows:

| | Percent by weight |
|---|---|
| $Na_2O$ | 6 to 10 |
| $PbO$ | 15 to 25 |
| $CoO$ | 0.5 to 4 |
| $TiO_2$ | 10 to 20 |
| $WO_3$ | 20 to 30 |
| $B_2O_3$ | 1 to 5 |
| $P_2O_5$ | 15 to 25 |

The amount of liquid vehicle may, of course, be varied within rather wide limits depending upon the viscosity of the ink which is desired and the viscosity depends in turn on the method of application used. Vehicles other than glycerine and methanol may also be used. In general, the vehicle should be readily oxidizable, in addition to imparting proper flow and adherence properties in accordance with the mode of transfer to be used to apply the ink to the glass surface. Methods of application such as spraying or stenciling may be used instead of the one which has been described.

The ink may, of course, be fired on to the glass surface by methods other than exposure to a gas flame, but the advantages of the ink are especially noticeable with the use of the gas flame method of firing.

The glass to which the ink is applied may be any of the usual types used for laboratory apparatus or vacuum tubes, and the like.

What is claimed is:

1. A glass marking ink having solids, expressed as percent by weight oxides, $Na_2O$: 6 to 10, PbO: 15 to 25, CoO: 0.5 to 4, TiO: 10 to 20, $WO_3$: 20 to 30, $B_2O_3$: 1 to 5, and $P_2O_5$: 15 to 25.

2. A glass marking ink having solids expressed as percent by weight oxides, $Na_2O$ about 8.02, PbO about 23.60, CoO about 2.82, $TiO_2$ about 17.9, $WO_3$ about 26.1, $B_2O_3$ about 3.22, and $P_2O_5$ about 18.34.

3. Glass having markings of the composition, expressed as percent by weight oxides, $Na_2O$: 6 to 10, PbO: 15 to 25, CoO: 0.5 to 4, $TiO_2$: 10 to 20, $WO_3$: 20 to 30, $B_2O_3$: 1 to 5, and $P_2O_5$: 15 to 25.

4. A glass marking ink having solids, expressed as percent by weight oxide, $Na_2O$: 6 to 10, CoO: 0.5 to 4, $WO_3$: 20 to 30 and $P_2O_5$: 15 to 25, these ingredients being present as fused sodium cobalto tungsto phosphate powder; also PbO: 15 to 25 and $B_2O_3$: 1 to 5 present as powdered eutectic lead borate; $TiO_2$: 10 to 20; and a liquid vehicle capable of being completely oxidized and volatilized at a temperature of about 550° C.

5. A method of marking glass comprising applying to a glass surface said markings in the form of an ink having solids, expressed as percent by weight oxides, $Na_2O$: 6 to 10, CoO: 0.5 to 4, $WO_3$: 20 to 30 and $P_2O_5$: 15 to 25, these ingredients being present as fused sodium cobalto tungsto phosphate powder; also PbO: 15 to 25 and $B_2O_3$: 1 to 5 present as powdered eutectic lead borate; $TiO_2$: 10 to 20; and a liquid vehicle capable of being completely oxidized and volatilized at a temperature of about 550° C. and heating said ink on said glass to a temperature sufficient to fuse said ink solids to the glass and to drive off the vehicle.

References Cited in the file of this patent

UNITED STATES PATENTS

| | | |
|---|---|---|
| 2,554,373 | Max-Claudet | May 22, 1951 |
| 2,663,658 | Schurecht | Dec. 22, 1953 |
| 2,723,205 | Gallup | Nov. 8, 1955 |
| 2,771,375 | Foraker | Nov. 20, 1956 |